(12) United States Patent
Newman et al.

(10) Patent No.: US 6,631,287 B2
(45) Date of Patent: Oct. 7, 2003

(54) INFRARED THERMOMETER

(75) Inventors: Richard W. Newman, Auburn, NY (US); Allan I. Krauter, Skaneateles, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 190 days.

(21) Appl. No.: 09/825,478

(22) Filed: Apr. 3, 2001

(65) Prior Publication Data

US 2002/0143257 A1 Oct. 3, 2002

(51) Int. Cl.[7] .............................. A61B 5/00; G01J 5/08; G01J 5/12; G01K 3/02; G01K 3/06
(52) U.S. Cl. .................. 600/474; 600/549; 374/124; 374/130; 374/132
(58) Field of Search ................. 600/474, 549; 374/121, 124, 130, 132, 133

(56) References Cited

U.S. PATENT DOCUMENTS

| | | | |
|---|---|---|---|
| 4,036,211 A | * | 7/1977 | Veth et al. ................ 600/549 |
| 4,054,057 A | | 10/1977 | Kluge |
| 4,365,307 A | | 12/1982 | Tatsuwaki et al. |
| 4,383,271 A | | 5/1983 | Berry et al. |
| 4,413,324 A | | 11/1983 | Tatsuwaki et al. |
| 4,450,479 A | | 5/1984 | Horne |
| 4,494,550 A | * | 1/1985 | Blazek et al. ............. 600/549 |
| 4,594,507 A | | 6/1986 | Elliott et al. |
| 4,700,708 A | | 10/1987 | New, Jr. et al. |
| 4,737,917 A | | 4/1988 | Perron |
| 4,754,139 A | | 6/1988 | Ennulat et al. |
| 4,784,149 A | * | 11/1988 | Berman et al. ............ 600/474 |
| 4,806,761 A | | 2/1989 | Carson et al. |
| 4,993,424 A | | 2/1991 | Suszynski et al. |
| 5,018,872 A | | 5/1991 | Suszynski et al. |
| 5,086,220 A | | 2/1992 | Berthold et al. |
| 5,091,646 A | | 2/1992 | Taylor |
| 5,127,742 A | * | 7/1992 | Fraden ..................... 374/130 |
| 5,272,340 A | | 12/1993 | Anbar |
| 5,274,235 A | | 12/1993 | Taylor |
| 5,274,489 A | | 12/1993 | Smith et al. |
| RE34,507 E | | 1/1994 | Egawa et al. |
| 5,289,006 A | | 2/1994 | Gal |
| 5,293,877 A | * | 3/1994 | O'Hara et al. ............ 600/549 |
| 5,368,392 A | | 11/1994 | Hollander et al. |
| 5,420,428 A | | 5/1995 | Bullington et al. |
| 5,438,199 A | | 8/1995 | Agam et al. |
| 5,469,855 A | | 11/1995 | Pompei et al. |
| 5,524,984 A | | 6/1996 | Hollander et al. |
| 5,530,246 A | | 6/1996 | Hawkins |
| 5,561,295 A | | 10/1996 | Jacksen et al. |
| 5,626,147 A | | 5/1997 | Lackey |

(List continued on next page.)

FOREIGN PATENT DOCUMENTS

| | | | |
|---|---|---|---|
| DE | 198 42 403 A1 | | 3/2000 |
| DE | 198 57 145 A 1 | | 3/2000 |
| EP | 0 875 197 A1 | | 11/1998 |
| GB | 2 311 368 | | 9/1997 |
| JP | 2001054505 | * | 2/2001 |
| WO | 86/06136 | | 10/1986 |
| WO | 00/16046 | | 3/2000 |
| WO | 0016047 | * | 3/2000 |

*Primary Examiner*—Joseph Pelham
(74) *Attorney, Agent, or Firm*—Wall Marjama & Bilinski LLP

(57) ABSTRACT

A plurality of miniature IR sensors disposed in a sensor array are aimed at a target area of interest, the array providing a thermal "image" of the target area. Processing electronics detect the hottest spot of the target as indicated by sensors in the array to directly indicate or estimate the hottest temperature(s) of the target area. Preferably, the sensor array can be utilized, for example, to determine the core body temperature of a patient by examination of the tympanic membrane.

137 Claims, 10 Drawing Sheets

U.S. PATENT DOCUMENTS

| | | |
|---|---|---|
| 5,632,555 A | 5/1997 | Gregory et al. |
| 5,645,349 A * | 7/1997 | Fraden ...................... 374/120 |
| 5,653,537 A | 8/1997 | Ignatowicz et al. |
| 5,686,779 A | 11/1997 | Vig |
| 5,727,880 A | 3/1998 | Hollander et al. |
| 5,729,019 A | 3/1998 | Krafthefer et al. |
| 5,747,863 A | 5/1998 | Shoda |
| 5,790,586 A | 8/1998 | Hilton, Jr. et al. |
| 5,820,264 A | 10/1998 | Tsao et al. |
| 5,823,678 A | 10/1998 | Hollander et al. |
| 5,847,832 A | 12/1998 | Liskow et al. |
| 5,902,044 A | 5/1999 | Pricer et al. |
| 6,011,891 A | 1/2000 | Katzir et al. |
| 6,272,375 B1 | 8/2001 | Katzir et al. |

\* cited by examiner

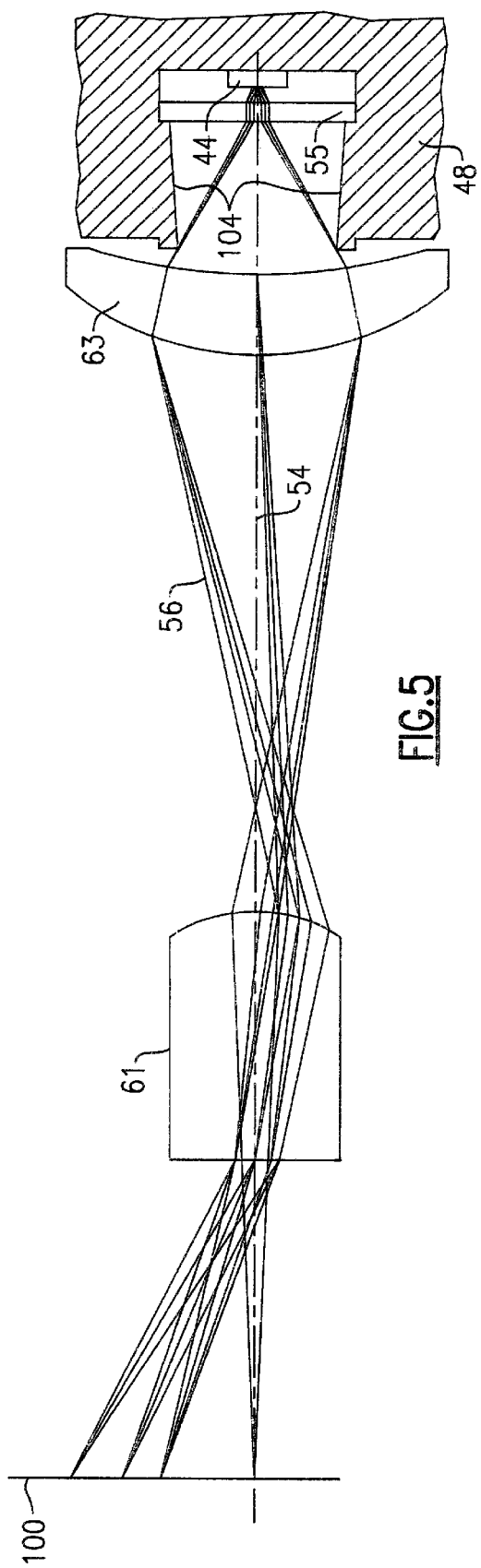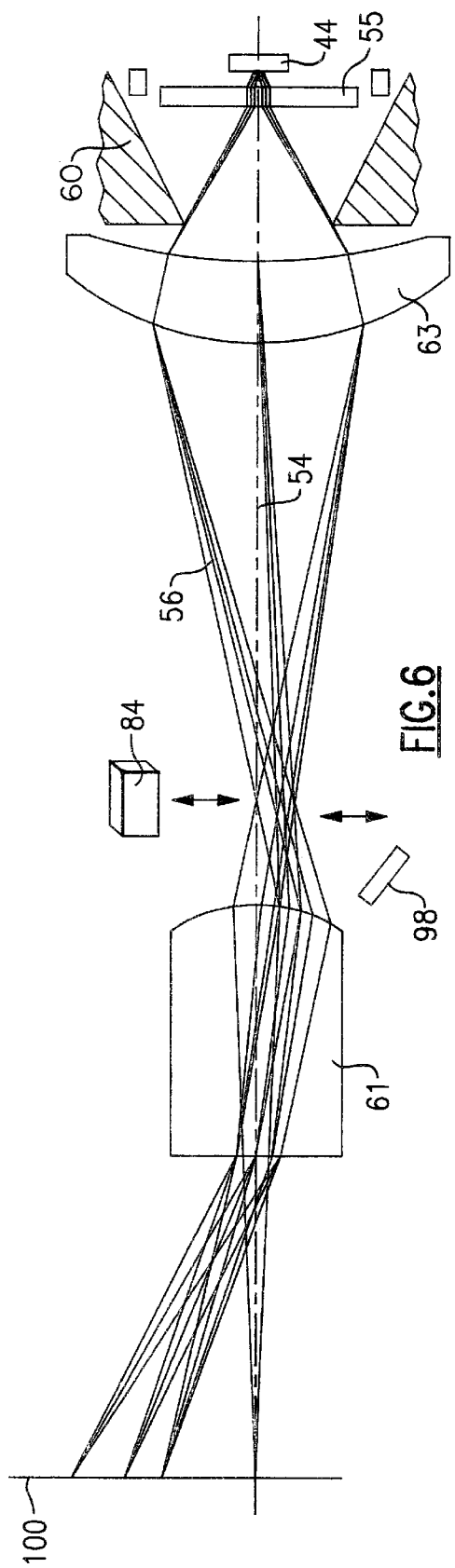

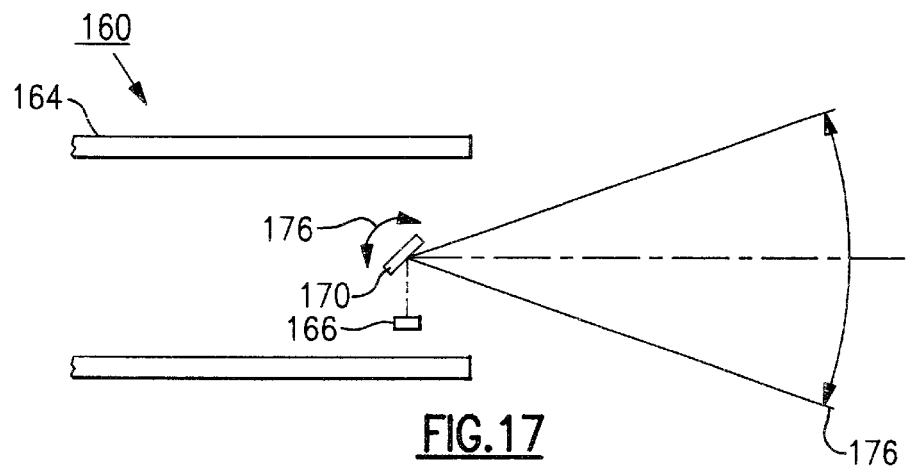
FIG. 17
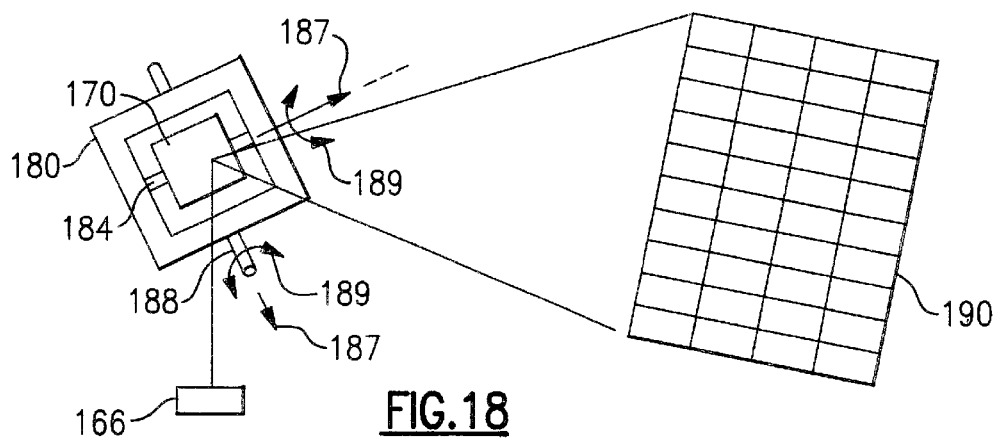
FIG. 18
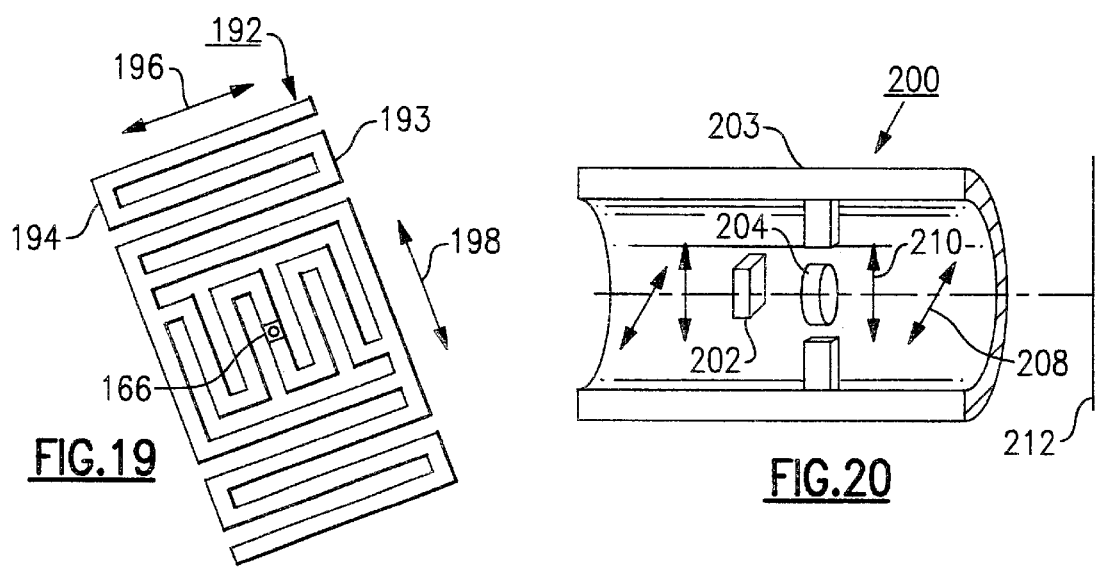
FIG. 19
FIG. 20

INFRARED THERMOMETER

FIELD OF THE INVENTION

The invention is directed to the field of diagnostic instruments and more particularly to a diagnostic instrument which is suitable for use with the ear or other medical/industrial target in order to accurately determine a temperature or a temperature profile.

BACKGROUND OF THE INVENTION

Medical diagnostic instruments such as infrared (IR) ear thermometers have traditionally been inaccurate as compared, for example, to thermistor type or mercury thermometers. This inaccuracy is due in large part to the large interrogation area found in the ear canal. This area includes not only the tympanic membrane (TM), but the ear canal walls as well. At present, there is not an adequate method of alerting the user when the instrument is not properly aligned with the TM. Similarly, the presence of foreign matter, such as ear wax, can block a direct line of sight to the TM and seriously affect the results indicated by the instrument. In addition, the narrowness of the ear canal, sometimes having large curves, also tends to prevent a suitable line of sight to the TM.

A basic assumption made in known IR thermometers is that the TM is within an interrogated area and that the TM subtends a specific portion of this interrogated area. Therefore, the manufacturers of these instruments will add a compensation factor arithmetically to the reading of the thermometer to make up for the fact that the device is reading the ear canal wall in addition to the TM. These devices are particularly inaccurate when the ear canal has been cooled, e.g., immediately after a patient has come indoors from the cold outdoors.

Recently, data have become available which demonstrate that the temperature of the TM in the lower anterior quadrant thereof is largely independent of ambient and skin temperature due to its interconnection with the hypothalamus. This temperature is highly representative of the body "core" temperature. The remainder of the TM is not necessarily at the same temperature. It is therefore quite desirable to measure this "hottest" spot in order to realize a more accurate reading.

Another issue to consider in the use of IR thermometers is how to deal with the IR radiation originating from the ear tip housing. Radiation from the tip housing combines with that of the target, such that temperature variations of the housing can affect the temperature reading from the sensor.

A known method of avoiding this problem is to keep the temperature of the housing isothermal and at a known level, as described in U.S. Pat. No. 4,759,324. In actual practice, however, this is difficult to accomplish, in part because the ear tip is relatively long, leading to axial temperature gradients. In addition, the geometry of the ear canal is such that little radial room is available for insulation, resulting in heat transfer to and from the ear tip housing by the environment.

SUMMARY OF THE INVENTION

It is a primary object of the present invention to improve the accuracy of medical diagnostic instruments.

It is a further primary object of the present invention to provide a medical diagnostic instrument which is capable of accurately determining body core temperature.

It is yet another primary object of the present invention to provide a medical diagnostic instrument which is capable of estimating temperature of a target area if a portion thereof cannot be viewed directly; for example, if a portion of the target area is somehow obstructed.

It is yet another primary object of the present invention to provide a means for negating or minimizing the effects of housing or transient temperature changes in a diagnostic medical instrument, such as an IR ear thermometer.

Therefore, and according to a preferred aspect of the invention there is provided a temperature measuring apparatus for interrogating a medical target area, the apparatus comprising:

a plurality of infrared sensors disposed in a sensor array, each of the sensors in the sensor array being capable of providing an output signal indicative of temperature of a portion of a medical target area such that said sensor array cumulatively provides a temperature profile of the medical target area; and processing means for processing output signals from the sensor array, the processing means including means for determining temperature based on the output signals therefrom.

Preferably, the above apparatus can be utilized in conjunction with an otoscopic or similar device to examine the ear and, more particularly the tympanic membrane wherein the sensor array can identify the blood vessel portions of the tympanic membrane, which may be interconnected with the hypothalamus, to more accurately predict body core temperature independent of thermal effects caused by other parts of the ear.

In a preferred embodiment, the apparatus displays a real time thermal "picture" or image of a medical target area, such as the ear, armpit, or other area in which processing means can detect or alternately predict the "hottest" spot(s) with a high degree of certainty.

According to a preferred embodiment, the described apparatus can selectively operate in at least two modes; a first mode in which the entire thermal "picture" is analyzed and a second mode in which the hottest spot can be estimated by interpolation or extrapolation through an examination of the thermal gradient of at least a portion of the thermal image of the target area.

If the latter mode is selected, the apparatus can include an indicator which alerts the user that the displayed value is an estimate, along with the probability of the exactness of the displayed estimate.

A feature of the described apparatus is that direct feedback is provided to the user as to whether or not the array is pointing at the intended target (e.g., the tympanic membrane). For example, by displaying real time false color representations of temperature ranges of the sensed area, the user can continue to aim the instrument until the "hot" spot is optimally positioned near the center of the thermal image. Alternately, and in lieu of a displayed image, the apparatus can include LCDs or other indicators to similarly guide the physician or other user to a target. For example, a green light indicator can be used to provide feedback to a user that the apparatus is aiming closer to an area of highest temperature. Conversely, a red light or other indicator can provide feedback to the user that the field of view of the apparatus is moving away from the hottest portions of the target.

Another feature of the present apparatus is that the apparatus can be calibrated using a known temperature standard to calibrate a single pixel or, if needed, the entire thermal array.

The apparatus can further include a baffle which permits energy only from the baffle and the target of interest to impinge on the sensor array, thereby negating the effects of the housing of the apparatus and of adjoining areas in the vicinity of the target area. This baffle can also be thermally connected to the substrate supporting the sensor array such that baffle is at the same temperature as the sensor array and can therefore be accounted for, such as in calibration.

Preferably, the baffle is located between the sensor array and the nearest lens of the focusing optics. The baffle forms the aperture stop of the system and defines the largest bundle of rays that the optical system can admit to reach the sensor from the target. All rays in this largest bundle originate in the object (target), as is desired. All other incoming rays reach the baffle either from the object or from other sources, such as the ear tip housing, but these rays are stopped by the baffle. Rays originating from the baffle can reach the sensor, but because the baffle is preferably at the same temperature as the sensor, calibration is not affected.

The instrument preferably includes a locator which permits the insertion portion to be positioned a predetermined distance into the ear canal of a patient. An objective lens distally placed in the insertion portion can then obtain an image of the outer ear, the lens being positioned sufficiently within the ear to substantially avoid ear wax, hair, and a bending portion of the ear canal, but prevented from contacting the tympanic membrane. The locator provides repeatability thereby allowing a thermal image to be superimposed for example, with a video image of the same target as captured by a video otoscope.

In addition, a proximal relay lens can be used to focus the image created by the objective lens onto the thermal sensor array, the array being located within the instrument head in conjunction with the baffle, such that the baffle eliminates IR radiation (heat) emanating from other than the target. This optical arrangement provides advantages in that a relatively wide field of view can be maintained to "see" the tympanic membrane with a low f# at the detector.

Another feature of the above apparatus is that the pulse of a subject can be accurately detected based on changes in temperature measured temporally once a blood vessel target has been identified.

According to another preferred aspect of the present invention, there is provided an ear thermometer comprising:
   a plurality of infrared sensors disposed in a sensor array, each of said infrared sensors being capable of providing an output signal indicative of temperature of a portion of a target area such that said array cumulatively provides a temperature profile of portions of the outer ear; and
   processing means for processing output signals from the sensor array, said processing means including means for determining core body temperature based on the output signals therefrom.

According to yet another preferred aspect of the present invention, there is provided a method for accurately determining the temperature of a medical target comprising the steps of:
   aiming a sensor array at a medical target, said sensor array comprising a plurality of infrared sensing elements each being capable of providing an output signal indicative of temperature of a portion of said medical target; and
   determining the temperature of each said portion of said medical target;
   outputting the signals representative of the temperatures of portions of the medical target.

An advantage of the present invention is that a target can be interrogated more accurately without transient thermal effects typically found in the vicinity of a medical target such as within the ear canal.

Another advantage produced by the present invention is that the presence of inflammations, abscesses, ear wax and other obstructions can quickly be identified and compensated for so as to more accurately identify and estimate the hottest temperature(s) of a defined target area.

These and other objects, features and advantages will become apparent from the following Detailed Description which should be read in conjunction with the accompanying drawings.

BRIEF DESCRIPTION OF THE DRAWINGS

FIG. 5 is a partial ray trace diagram of the optical portion of the instrument of FIG. 1, including a thermal baffle according to a first embodiment of the present invention;

FIG. 6 is a partial ray trace diagram of the optical portion of the instrument of FIG. 1, including a thermal baffle according to a second embodiment of the present invention and further including calibration means for the instrument;

FIG. 17 illustrates a partial plan view of an instrument having a fixed thermal sensor used in conjunction with a scanning mirror assembly;

FIG. 18 illustrates an enlarged view of the thermal sensor and scanning mirror of FIG. 17;

FIG. 19 illustrates an alternate embodiment of a movable thermal element;

FIG. 20 is a side diagrammatic partial view of a diagnostic instrument having a movable optics assembly and FIG. 21 illustrates a predicted plot of temperature using an interpolation technique.

DETAILED DESCRIPTION

The following description relates to certain embodiments of a medical diagnostic instrument system used in conjunction with an otological medical device and particularly for measuring the body core temperature of a patient through interrogation of the tympanic membrane. It will be readily apparent from the following discussion, however, that the concepts detailed herein will find similar application in measuring other medical targets, such as under the armpit, under the tongue, the colon, portions of the skin for skin disorders, tumors, etc, as well as other anatomical areas of interest.

In addition, the concepts described herein can further be employed in devices intended for interrogating certain industrial targets. Finally, it should be pointed out that certain terms, such as "upper", "lower", "front", "back", "distally", "proximally" and the like, are used frequently throughout the discussion. These terms, however, are merely provided to provide a frame of reference for use with the accompanying drawings and are not intended to specifically limit the inventive concepts described herein.

Figure 1:
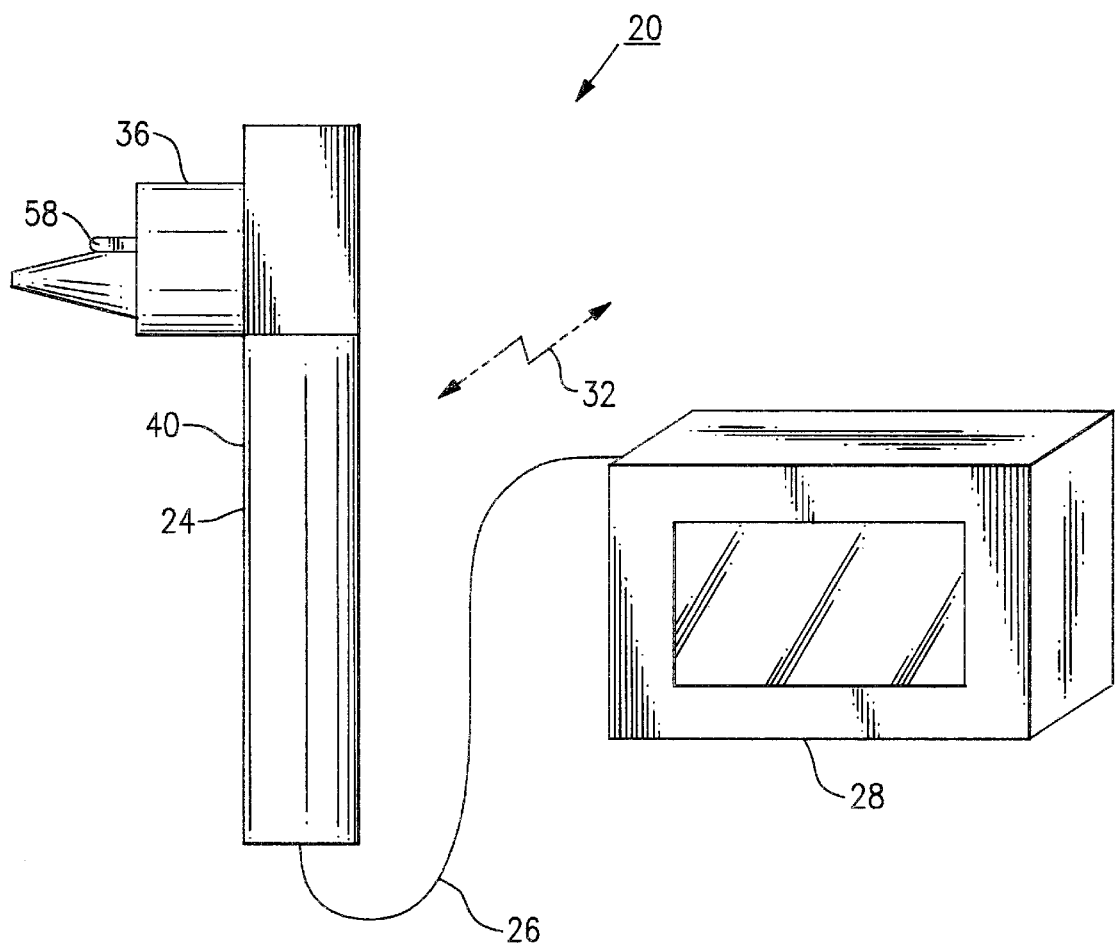
FIG. 1 is a partial perspective view of a diagnostic instrument system in accordance with a preferred embodiment of the present invention.

Referring to FIG. 1, there is depicted an instrument system 20 in accordance with a preferred embodiment of the present invention. A portable examination or diagnostic instrument 24 includes a tethered electrical/video signal connection 26 with a video monitor 28 or other video peripheral device (not shown), although alternately a wireless connection through RF, IRdA or other means, shown figuratively as 32, can also be employed.

Figure 2A:
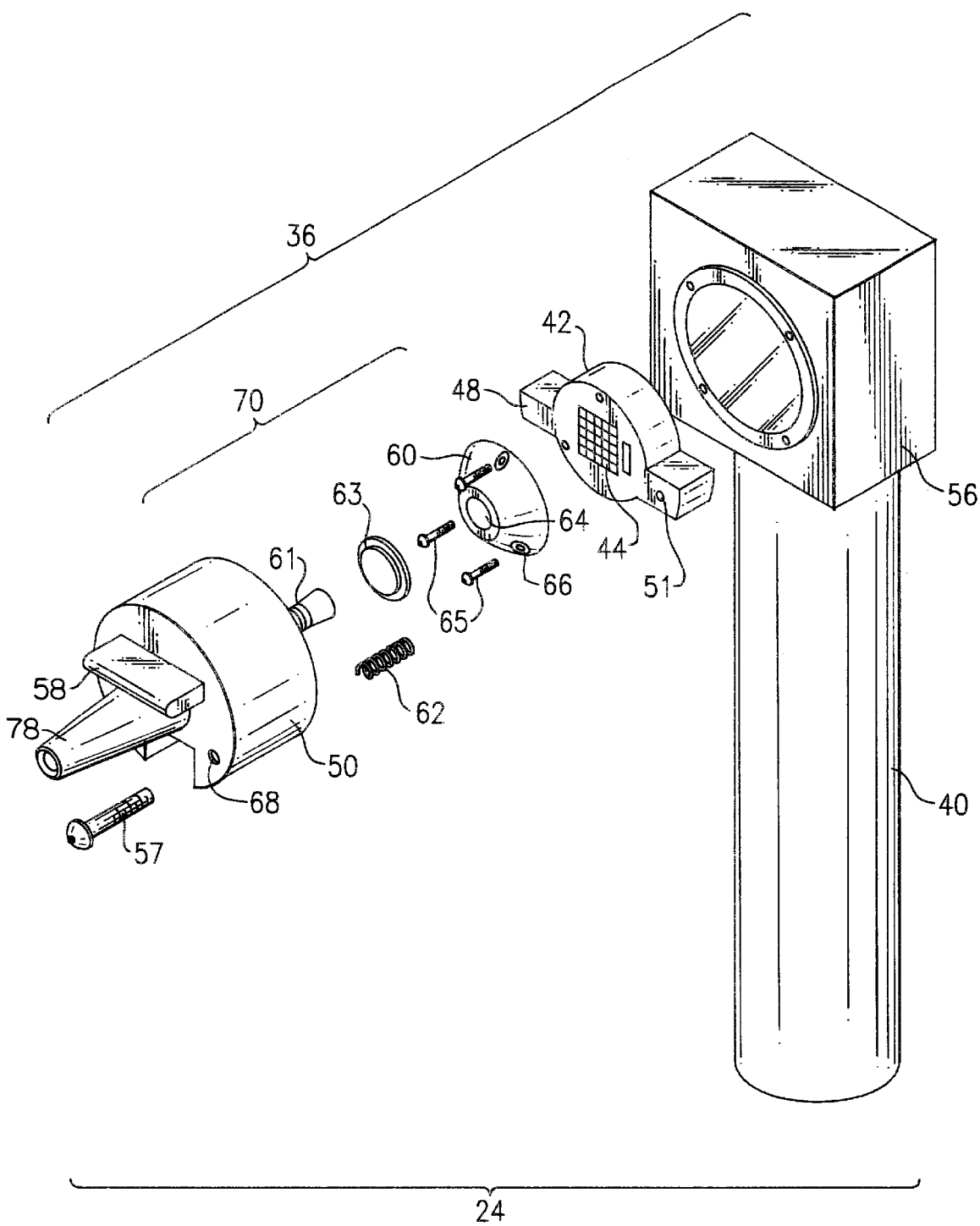
FIG. 2(a) is a partially exploded top perspective view of the diagnostic instrument depicted in FIG. 1.
Figure 2B:
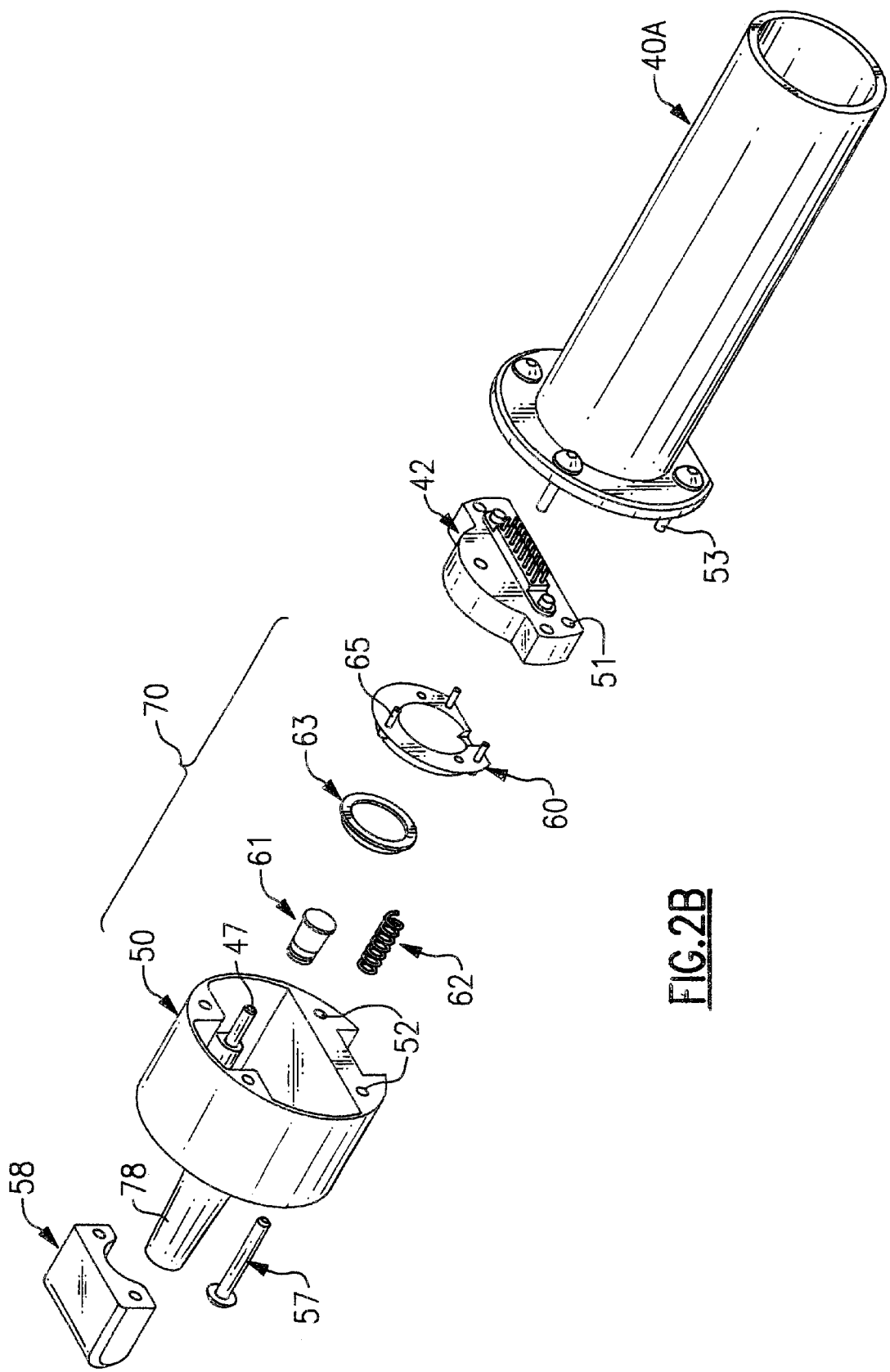
FIG. 2(b) is an exploded rear perspective view of a diagnostic instrument similar to that depicted in FIG. 2(a)

Referring to FIGS. 1–2(b), the portable examination instrument 24 includes an instrument head 36 which is attached, releasably or otherwise, to the top of a hand-grippable battery handle 40. The instrument head 36 is shown nearly identically in FIGS. 2(a) and 2(b), except as noted specifically herein, though the hand-grippable handle 40A shown in FIG. 2(b) is a variation. Similar variations for use with the instant instrument head 36 are contemplated within the scope of the present invention. For example, and rather than using a video monitor, the instrument head could include a portable integral display.

Referring to the exploded views of FIGS. 2(a) and 2(b), the instrument head 36 includes a detector assembly 42 and an optical assembly 70 which are each disposed within the confines of a housing 50. The housing 50 is attached to the hand-grippable handle 40, 40A, by conventional means. For example and as shown in FIG. 2(b), threaded fasteners 53, can be used to secure the handle 40A to the rear side of the housing 50 using threaded holes 52.

Figure 10:
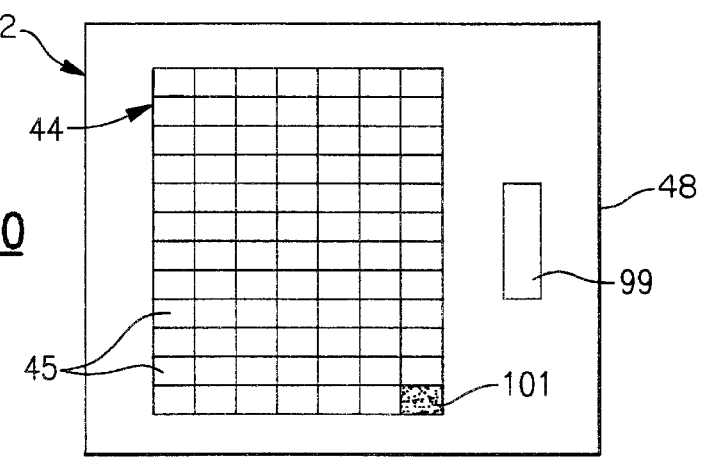
FIG. 10 is an enlarged front view of the thermal sensor array of the instrument of FIG. 1.

The detector assembly 42 includes an IR element or sensor array 44 having a plurality of miniature infrared sensors 45, FIG. 10, such as the bolometer array manufactured by TI/Raytheon, which are mounted onto a supporting body 48. According to the present invention, a two dimensional 16×16 element array is defined, though the parameters thereof can easily be varied depending on the application. Furthermore, a single element or a one dimensional array can also be utilized based on the inventive concepts of the present invention. An enlarged view of an IR sensor array 44 in accordance with the present invention is depicted in FIG. 10. Each of the individual elements 45 comprising the sensor array 44 senses infrared radiation of a portion of a target area, akin to individual pixels of an electronic imager, such as a CCD, and produces an output signal which can be processed through suitable electronics to provide temperature of that sensed portion.

Referring to FIG. 2(a)–FIG. 4, the optical assembly 70 includes a conically shaped aperture stop 60, which overlays the miniature IR sensor array 44, as well as an objective lens 61 and a relay lens 63 which focus incoming IR light onto the IR sensor array 44 of the detector assembly 42. The aperture stop 60 is mounted by conventional means such as threaded fasteners 65 (FIG. 2b) onto the supporting body 48. The aperture stop 60 includes a central through opening 64 which provides optical access to the IR sensor array 44. Preferably, the aperture stop 60 is aligned with the IR sensor array 44 and is attached onto the supporting body 48 using fasteners 65 inserted through the holes 66.

Still referring to FIGS. 2(a)-4, the housing 50 includes a substantially frusto-conical insertion portion 78 which is sized to receive a speculum (not shown) and which can be placed up to a predetermined distance into the ear canal of a patient (not shown) such as through the use of a locator 58. The lenses 61, 63 combine to focus incoming optical energy onto the miniature IR sensor array 44. The objective lens 61 is disposed at the distal end of the frusto-conical insertion portion 78 of the housing 50 while the relay lens 63 is placed adjacent the aperture stop 60. The housing 50 is attached to the handle 40, 40A by screws 53 that thread into the proximal end of the housing at threaded holes 52, FIG. 2(b).

Moreover, the objective lens 61 being placed at the distal tip opening of the insertion portion 78 permits a wide field of view in order to "see" the tympanic membrane and to avoid hair, ear wax, and a significant bending portion of the ear canal. The locator 58 is positioned and shaped to allow the distal end of the insertion portion 78 to be repeatably positioned a predetermined distance within the ear canal, but without contacting the tympanic membrane.

The relay lens 63 permits the detector assembly 42 to be positioned within the instrument head 36 wherein the image obtained by the objective lens 61 can be focused thereupon.

The locator 58 provides repeatability and consistency with regard to alignment, depth of field, and orientation of a thermally imaged target area. This provides an additional advantage. For example, a thermal image can therefore be superimposed or have superimposed thereupon, a corresponding video image of the target area captured by a video otoscope (not shown).

The above optical assembly 70 can be adjusted using a focusing screw 57 inserted through opening 68 in the housing 50 and threaded into the supporting body at hole 51. A focus spring 62 provides a biasing force to permit adjustment of the assembly containing the supporting body 48 and aperture stop 60 relative to the housing 50. During adjustment, supporting body 48 slides on pins 47, FIGS. 2(b) and 4, extending from the interior of the insertion portion 78.

Figure 3:
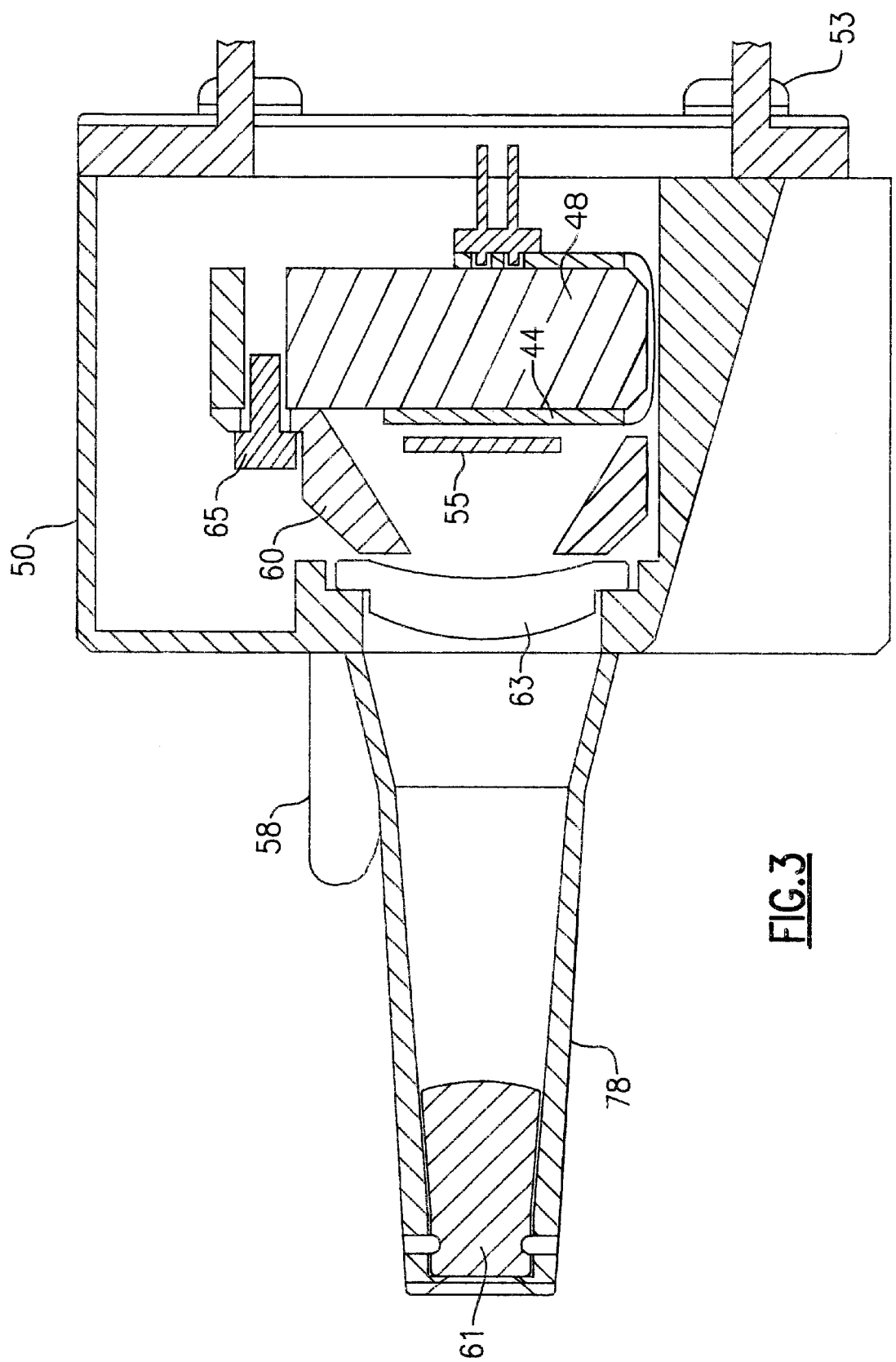
FIG. 3 is a side sectioned view of the instrument of FIGS. 1–2(b)
Figure 4:
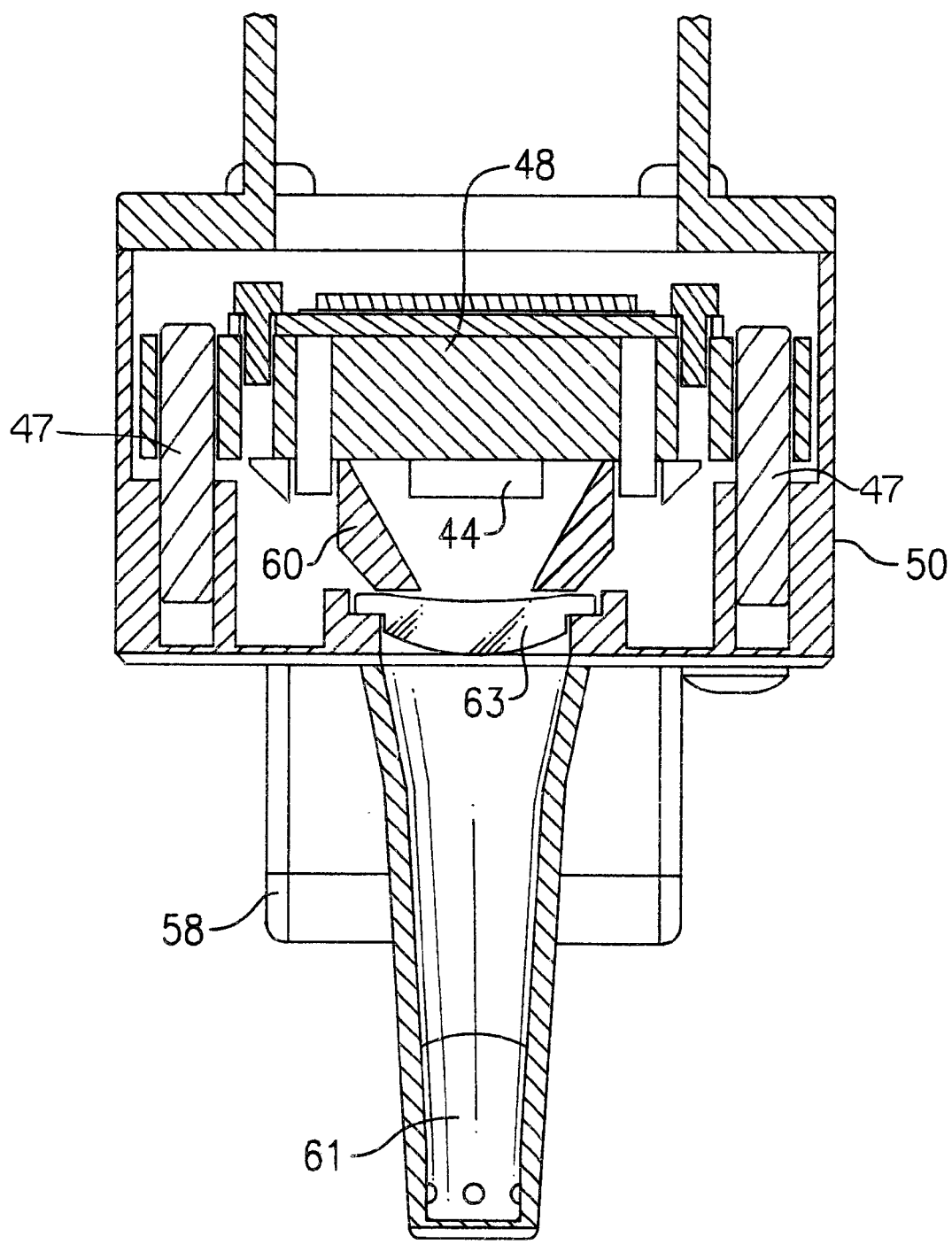
FIG. 4 is a top sectioned view of the instrument of FIGS. 1–3.

Referring to FIGS. 3, 4, and 6, the aperture stop 60 further limits the amount of energy passing through the optical subassembly 70 from a target area 100 to the IR sensor array 44.

An alternate aperture stop 104 is illustrated in FIG. 5, the aperture stop being thermally linked directly to the supporting body 48 of the detector assembly 42, to provide the same temperature of the aperture stop as that of supporting body 48 and IR thermal array 44 given that the aperture stop also emits energy which is detected by the IR sensor array 44.

Referring to FIGS. 5 and 6, the aperture stops 60, 104, as used in conjunction with the optical subassembly 70, provide the following benefits. As noted, the small diameter objective lens 61 can be positioned at the distal end of the insertion portion 78 to bypass hair, ear wax, and significant bending of the ear canal and to provide a relatively wide field of view of the target area. Furthermore, the provision of an aperture stop for the energy focused on the detector assembly 42 by the relay lens 63, insures that the representative pixels of the sensor array 44 see energy emanating only from the target 100, the aperture stop 60, 104, and the relay lens 63. The relay lens 63 emits a negligible amount of energy as compared to the target 100 and the aperture stop 60, 104. The effect of the aperture stop 104, FIG. 5, is negligible in relation to the signals received by the sensor array 44 in calculating the temperature of the interrogated target area 100. The energy of the aperture stop 60, FIG. 6, can be accounted for by subtraction as part of calibration of the sensor array 44, such as described herein.

Referring to FIG. 6, a movable target 84, such as a diode or other form of calibration element, having a known temperature and emissivity is movably disposed in relation to the optical path 54 to the detector assembly 42 in order to initially calibrate the miniature IR sensor array 44. Alternately, an optical element 98 could be aligned with the target 84 such that either the target 84 and/or the optical element 98 "moves" the target into and out of the optical path 54 to the IR sensor array 44.

Referring to FIG. 10, and in lieu of the target 84, FIG. 6, a temperature measuring element 99, such as a thermocouple or thermistor, can be disposed on the supporting body 48 of the detector assembly 42, the element 99 being capable of measuring the reference temperature of the supporting body 48 to permit calibration of the array 44. Alternatively, and still referring to FIG. 10, one of the pixels 101 of the array can be "blinded" to incoming energy from the target to achieve a similar effect. It should be further noted in passing that a temperature measuring element, such as described above, could otherwise be disposed (e.g., on the aperture stop 60, FIG. 6).

Figure 7:
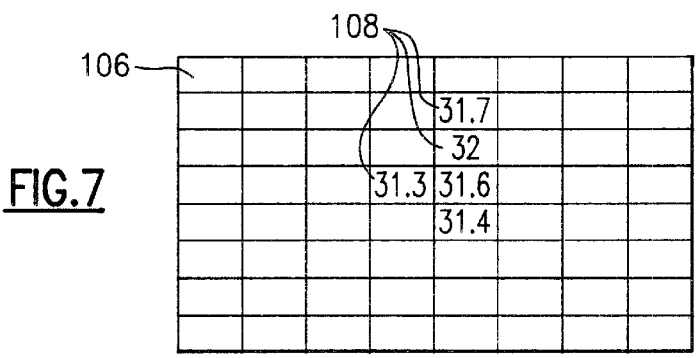
FIG. 7 depicts a typical output display indicating portion of a temperature profile according to the diagnostic instrument system of FIG. 1.
Figure 8:
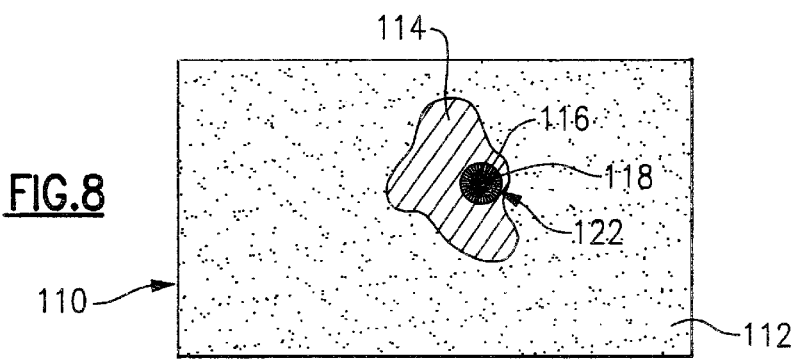
FIG. 8 is a display output indicating regions of various temperatures of a predetermined target area.
Figure 9:
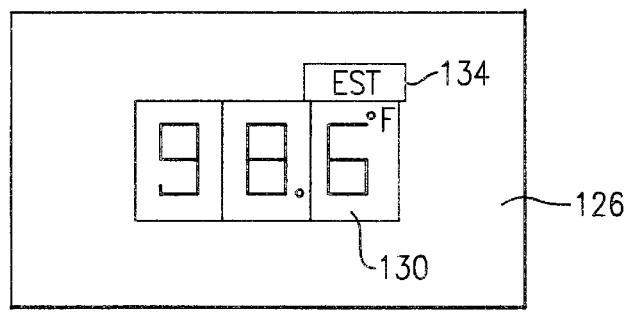
FIG. 9 depicts a digital temperature display for the instrument of FIG. 1.

Referring to FIGS. 7–9, the display output of the IR sensor array 44 can be demonstrated to cover various forms. In a first version shown in FIG. 7, the display output can take the form of a matrix or grid 106 having individual numeric processed temperature values 108. The displayed temperatures 108 can cover a portion of the grid 106, indicating only those temperature values exceeding a specific threshold temperature, as shown, or all of the sensor processed output values can be displayed.

According to FIG. 8, the display output 110 can be arranged into a predetermined format. For example and as shown, output signals of the individual sensors can be segregated into different visually perceivable forms, such as textures or false colors, such as first, second, third, and fourth ranges 112, 114, 116, 118, respectively, leading the user to identify a "hot" spot 122. It should be readily apparent that literally any visually perceivable form could be utilized in order to provide contrasts between ranges of temperatures as detected by the IR sensor array 44.

Alternately and in lieu of providing a field of view as shown in FIGS. 7 and 8, a simplified display output 126 can include merely the hottest temperature in the field of view as a single temperature value, 130, such as shown in FIG. 9. It will be readily apparent that other forms of representation can be contemplated by one of sufficient skill in the field. There may be situations, as described herein below, in which the displayed temperature is not the hottest temperature of the target area. In those instances, the display output 126 can also include an indicator 134 which informs the user that the displayed temperature 130 is estimated.

The detection of the hottest temperature of a medical target area, such as the ear, indicates body core temperature given that the arteries in the tympanic membrane are closely tied to the hypothalamus, the temperature regulator of the human body. Identification of body core temperature as described herein through the use of an IR sensor array provides an improvement in accuracy and reliability in the field of thermometry. In addition, and based on an adequately high signal to noise ratio, the pulse rate of the patient can also be determined due to flow of hot blood into the arteries. The transient effect can be included in each of the above display representations or separately to indicate this value.

As alluded to above, it is possible that the hottest temperature might not be directly discernible based on either the presence of an obstruction or that the hottest temperature of the target area is not in the immediate field of view of the IR sensor array 44. For example, and as shown in FIG. 11, it is possible that a portion 129 of an overall target area 120 (in this case a portion of the tympanic membrane 121) is obstructed, as denoted by phantom line 124, such as by ear wax, an abscess, ear canal wall etc., which blocks the hottest spot 128 (that is the spot having the highest temperature) from view.

Referring to FIGS. 11–14, a methodology of estimating a hottest temperature is illustrated pictorially. The processing electronics provided in the detector assembly 42, FIG. 3, includes a microprocessor (not shown) having sufficient memory for storing the calibrated values of the output signals of each of the IR sensors 45, FIG. 10, of the IR sensor array 44, FIG. 3.

Figure 11:
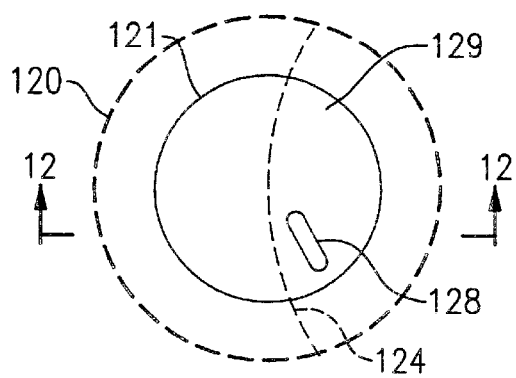
FIG. 11 depicts a view of a target area including an occluded portion.

Due to the presence of the obstruction shown in FIG. 11, a corresponding temperature profile 132 would be detected by the present sensor array. In actuality, however, the obstructed portion of the temperature profile 132 would be correctly represented by the profile depicted as 136 including the hottest spot, depicted as 128 in FIG. 11, and indicated as 140 in FIG. 12, if the obstruction did not exist.

Figure 13:
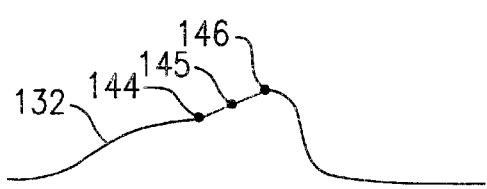
FIG. 13 depicts a predicted plot of temperature for the target area of FIG. 11.
Figure 14:
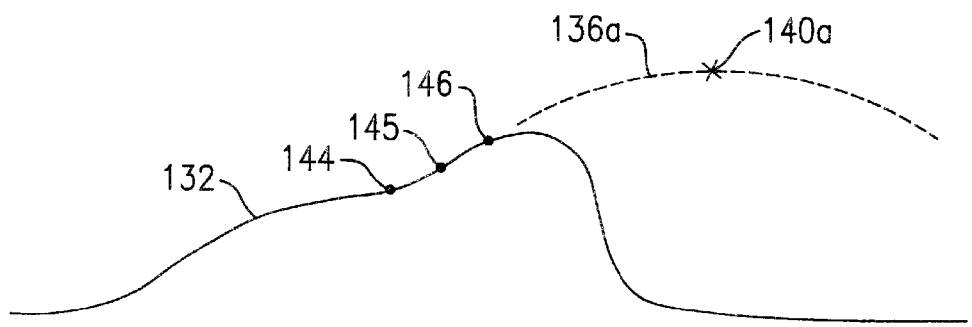
FIG. 14 depicts another predicted plot of temperature for the target area of FIG. 11.

Referring to FIG. 13, a predetermined number of points 144, 145, 146 along the profile 132 are processed due to the increase in temperature. A highest point is then extrapolated by curve fitting through the points 144, 145, 146 to determine an estimated hottest spot 140a, FIG. 14 through fitted curve 136a, FIG. 14.

Figure 21:
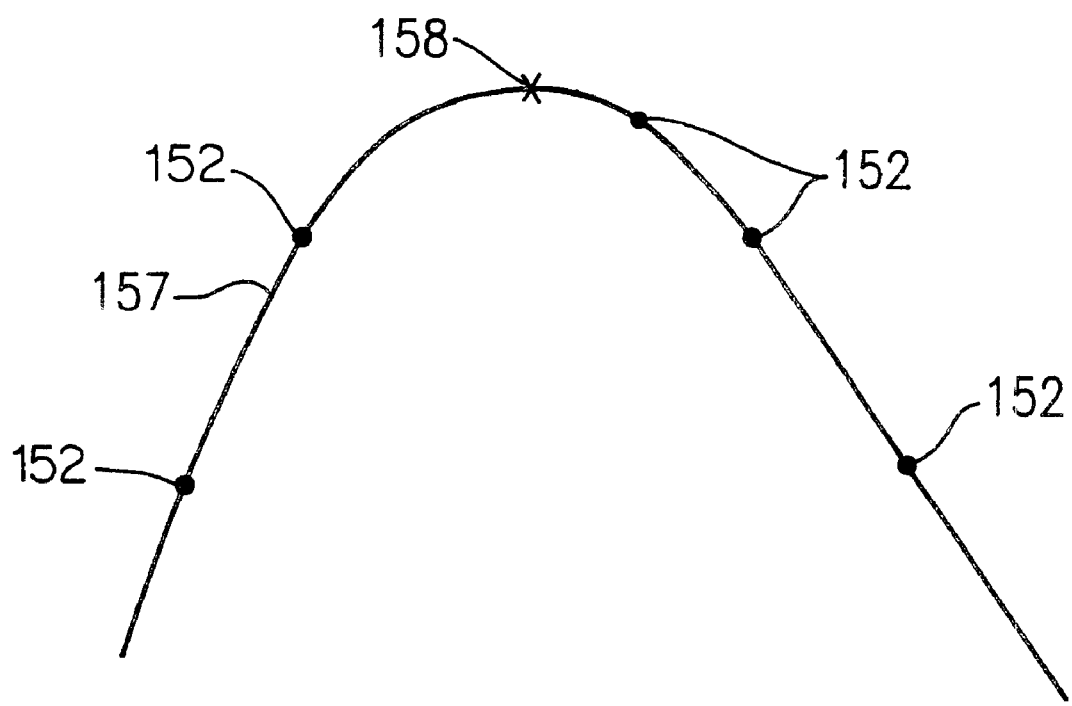

Referring to FIG. 21, a hottest temperature of a target area can also be interpolated through curve fitting, for example, if the hottest spot is "between" pixels of the sensor array 44, FIG. 10, such as fitting an appropriate curve or temperature profile 157 through a number of predetermined temperature points 152 and interpolating an estimated hottest temperature 158.

Figure 15:
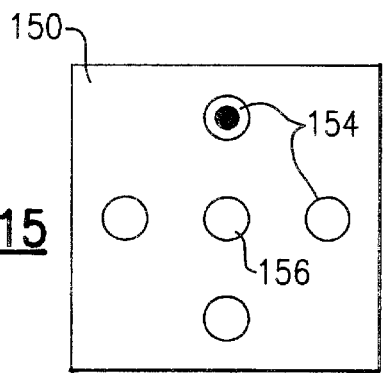
FIG. 15 illustrates a display portion for the diagnostic instrument made in accordance with a preferred aspect of the invention.
Figure 12:
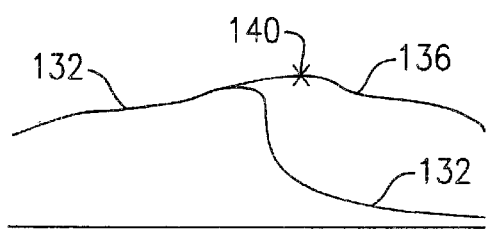
FIG. 12 depicts a relative plot of temperature for the target area of FIG. 11.
Figure 16:
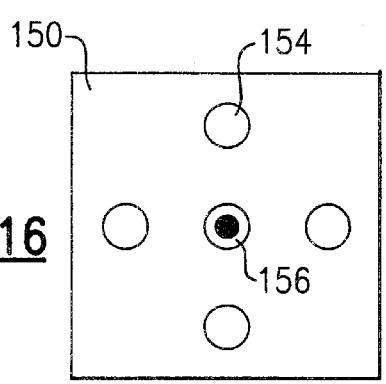
FIG. 16 illustrates the display portion of FIG. 15 indicating the centering of the hottest temperature value.

Referring to FIGS. 15 and 16, and as noted, it is also possible that the hottest temperature is not within the field of view of the instrument. According to a preferred embodiment of the invention, the instrument includes an indicator 150 connected in relation to the processing electronics of the device, the indicator having a set of directional guides 154 arranged in 90 degree intervals about a center guide 156. It should be readily apparent that the above description is exemplary as any varied number of directional guides can be suitably placed along a periphery. As the instrument is used, the hottest temperature in the field of view of the IR sensor array is determined and the locale of the hottest temperature is indicated by a corresponding directional guide 154. The guide 154 aids the user in adjusting the field of view of the instrument by moving the instrument in the direction indicated by the indicator 150. As the instrument is adjusted by the user, the directional guide 154 will shift until the hottest temperature value is eventually located in the center guide 156, as shown in FIG. 16, thereby indicating that the hottest temperature value has been centered in the field of view. During the adjustment, it is possible that a new hottest temperature will be located, the value of this temperature being stored into memory and compared using the processing electronics during use as the field of view is changed. Alternately, and rather than using multiple LEDs as shown in FIGS. 15 and 16, a single LED could be provided. In this instance, the LED could provide the user with a visual indication when the hottest temperature has been detected by the microprocessor.

Alternately, other indicating means could be employed to notify the user that the hottest temperature of a target area has been located or identified, such as, for example, an audio signal or tactile feedback, such as a vibrational signal.

Referring to FIGS. 17–19, alternate techniques are herein described in lieu of using a two dimensional IR sensor array. That is, alternately, an examination instrument 160 can utilize a single sensor or one dimensional IR sensor array 166 in conjunction with a movable mirror 170 to scan the target area of interest, as defined by 176 in two dimensions. The mirror 170 is retained within an instrument housing 164 and is made rotatable, for example, as supported within a frame 180 having rotatable sections 184, 188 to provide rotation as indicated by arrows 189 about respective axes 187 to define a scan field 190 of the target area. An alternate micro-machined sensor support 192, in this case for a single IR sensor 166, is illustrated in FIG. 19, the support being translatable along orthogonal axes 196, 198. In this case mirror 170, FIG. 17, is stationary and the single IR sensor 166 translates in the two orthogonal directions to capture each portion of field 190. As in the preceding, the sensor 166 can be calibrated using a movable or dedicated reference temperature element (not shown), or the other methods described in the preceding embodiment.

Finally, referring to FIG. 20, a further embodiment partially depicts an apparatus 200 including a single IR sensor 202 disposed within a housing 203. The sensor 202 or linear (one-dimensional) sensor array can be translated along orthogonal directions 208, 210 with respect to a target area 212 through a lens or aperture 204. The aperture 204 or lens can alternately be moved (i.e. translated) in a similar manner to effectively scan a thermal image of the target area 212.

PARTS LIST FOR FIGS. 1–21

20 instrument system
24 examination or diagnostic instrument
26 tethered signal connection
28 video monitor
32 wireless connection
36 instrument head
40 hand-grippable battery handle
40A hand-grippable battery handle
42 detector assembly
44 IR sensor or element array
45 IR sensors
47 pins
48 supporting body
50 housing
51 hole
52 holes
53 threaded fasteners
54 optical path
55 window
56 light rays
57 focusing screw
58 locator
59 substrate
60 aperture stop
61 objective lens
62 focus spring
63 relay lens
64 central opening
65 threaded fasteners
68 opening
70 optical subassembly
74 housing
78 insertion portion
80 frusto-conical section
84 movable target
98 optical element
99 temperature measuring element
100 target area
101 blinded pixel
104 aperture stop
106 display output
108 temperature readings
110 display output
112 first range
114 second range
116 third range
118 fourth range
120 target area
121 tympanic membrane
122 hot spot
124 line
126 display output
128 hottest spot
129 portion
130 temperature value
132 actual temperature profile
134 estimation indicator
136 temperature profile
136a estimated temperature profile
140 maximum temperature
140a estimated maximum temperature
144 point
145 point
146 point
150 indicator
152 points
154 directional guides
156 centered guide
157 curve
158 interpolated hottest temperature
160 diagnostic instrument
164 housing
166 IR sensor
170 movable mirror
176 field of view
180 support structure
184 rotatable section
187 axes
188 rotatable section
189 arrow
190 scan field
196 direction
198 direction
200 apparatus
202 sensor
204 lens or aperture
208 direction
210 direction
212 target area Though the above invention has been described in terms of certain embodiments, it will be appreciated that variations and modifications are possible within the scope of the invention as claimed herein, including use for various medical and industrial targets capable of being thermally imaged. For example, a similar IR sensor array assembly could be incorporated into an endoscope or laparoscope in order to examine a polyp or the appendix. Likewise, a sensor assembly as described could also be included in a borescope for examining the interior of an industrial target, such as the interior of an aircraft engine.

We claim:

1. A temperature measuring apparatus for interrogating a medical target area, said apparatus comprising:

a plurality of infrared sensors disposed in a sensor array, each of said sensors being capable of providing an output signal indicative of temperature of a portion of said medical target area such that said sensor array cumulatively provides a temperature profile of said medical target area;

processing means for processing output signals from the sensor array, said processing means including means for determining temperature based on the output signals therefrom; and means for displaying the output signal of at least one infrared sensor of said sensor array, said displaying means includes means for displaying ranges of the temperature profile of said medical target area to a user in a predetermined format wherein said range displaying means includes means for determining core body temperature from said temperature profile.

2. An apparatus as recited in claim 1, wherein said displaying means includes at least one LCD capable of displaying at least one output signal from said sensor array.

3. An apparatus as recited in claim 1, wherein said displaying means includes a video monitor capable of displaying at least output signal from said sensor array.

4. An apparatus as recited in claim 1, wherein said displaying means includes means for displaying the hottest temperature(s) of the medical target area interrogated by said sensor array.

5. An apparatus as recited in claim 1, wherein said displaying means includes means for displaying all of the output signals of said sensor array.

6. An apparatus as recited in claim 1, including means for calibrating at least one infrared sensor of said sensor array.

7. An apparatus as recited in claim 6, wherein said calibration means includes a small target having a known temperature and emissivity disposed in the optical path to said sensor array.

8. An apparatus as recited in claim 7, including means for moving said target into and out of the optical path to said sensor array.

9. An apparatus as recited in claim 7, including at least one optical element aligned with said target of known temperature, said at least one of said at least one optical element and said target being movable relative to the other to move the target selectively into and out of the optical path to the sensor array.

10. An apparatus as recited in claim 6, including a temperature measuring element disposed in a least one of said sensor array and a substrate supporting said sensor array, said temperature measuring element being capable of measuring a reference temperature.

11. An apparatus as recited in claim 1, including at least one lens for focusing a thermal image of said medical target area onto said sensor array.

12. An apparatus as recited in claim 11, including means for thermally isolating the sensor array from input other than that of the medical target area.

13. An apparatus as recited in claim 12, wherein said thermal isolation means includes an aperture stop disposed in relation to said at least one lens and said sensor array to allow only energy from said medical target area and said aperture stop to impinge on said sensor array.

14. An apparatus as recited in claim 1, including at least one lens disposed in relation to said sensor array along an optical axis, said at least one of said at least one lens and said sensor array being movable for variably focusing an image of said medical target area onto said sensor array.

15. A temperature measuring apparatus for interrogating a medical target area, said apparatus comprising:

a plurality of infrared sensors disposed in a sensor array, each of said sensors being capable of providing an output signal indicative of temperature of a portion of said medical target area such that said sensor array cumulatively provides a temperature profile of said medical target area; and processing means for processing output signals from the sensor array, said processing means including means for determining temperature based on the output signals therefrom, wherein said processing means includes means for determining pulse based upon temporal variations in the output signals of certain portions of said temperature profile.

16. An apparatus as recited in claim 15, wherein said medical target area is the tympanic membrane.

17. An apparatus as recited in claim 15, wherein said medical target area is the armpit.

18. An apparatus as recited in claim 15, wherein said medical target area is under the tongue.

19. An apparatus as recited in claim 15, wherein said medical target area is the colon.

20. An apparatus as recited in claim 15, wherein said medical target area is the rectum.

21. An apparatus as recited in claim 15, wherein said medical target area is the temple area of a patient.

22. An apparatus as recited in claim 15, wherein said medical target area is an in vivo portion of skin.

23. An apparatus as recited in claim 15, wherein said processing means includes means for measuring each output signal of said sensor array and determining the output signals indicative of the hottest temperatures of said medical target area.

24. An apparatus as recited in claim 15, wherein said sensor array is a linear one dimensional array.

25. An apparatus as recited in claim 15, wherein said sensor array is a two-dimensional sensor array.

26. An apparatus as recited in claim 15, wherein said processing means including means for determining the core body temperature based on the output signals of said plurality of infrared sensors.

27. A temperature measuring apparatus for interrogating a medical target area, said apparatus comprising:

a plurality of infrared sensors disposed in a sensor array, each of said sensors being capable of providing an output signal indicative of temperature of a portion of said medical target area such that said sensor array cumulatively provides a temperature profile of said medical target area; and processing means for processing output signals from the sensor array, said processing means including means for determining temperature based on the output signals therefrom, wherein said processing means includes estimating means for estimating the hottest temperature(s) of said medical target area, wherein said estimating means predicts the hottest output signals of at least one estimated temperature from a profile of output signals, wherein said estimating means includes means for interpolating the hottest temperature from the output signals in said sensor array.

28. An apparatus as recited in claim 27, including means for indicating to a user that the output signal corresponding to the hottest temperature of the sensor array does not indicate the hottest temperature of the medical target area.

29. An apparatus as recited in claim 28, wherein said indicating means includes at least one of the group of audio, tactile, and light feedback.

30. A temperature measuring apparatus for interrogating a medical target area, said apparatus comprising:

a plurality of infrared sensors disposed in a sensor array, each of said sensors being capable of providing an output signal indicative of temperature of a portion of said medical target area such that said sensor array cumulatively provides a temperature profile of said medical target area; and processing means for processing output signals from the sensor array, said processing means including means for determining temperature based on the output signals therefrom, wherein said processing means includes estimating means for estimating the hottest temperature(s) of said medical target area, wherein said estimating means predicts the hottest output signals of at least one estimated temperature from a profile of output signals, wherein said estimating means includes means for extrapolating the hottest temperature from a series of output signals if portions of the medical target are obstructed from the sensor array.

31. A temperature measuring apparatus for interrogating a medical target area, said apparatus comprising:

a plurality of infrared sensors disposed in a sensor array, each of said sensors being capable of providing an output signal indicative of temperature of a portion of said medical target area such that said sensor array cumulatively provides a temperature profile of said medical target area;

processing means for processing output signals from the sensor array, said processing means including means for determining temperature based on the output signals therefrom, and means for indicating to a user that the output signal corresponding to the hottest temperature of the sensor array does not indicate the hottest temperature of the medical target area wherein said indicating means includes directional guiding means for guiding a user to that portion of the medical target area having the hottest temperature.

32. An apparatus as recited in claim 31, wherein said indicating means includes at least one of the group consisting of audio, tactile, and light feedback.

33. A temperature measuring apparatus for interrogating a medical target area, said apparatus comprising:

a plurality of infrared sensors disposed in a sensor array, each of said sensors being capable of providing an output signal indicative of temperature of a portion of said medical target area such that said sensor array cumulatively provides a temperature profile of said medical target area; and processing means for processing output signals from the sensor array, said processing means including means for determining temperature based on the output signals therefrom, wherein said processing means includes estimating means for estimating the hottest temperature(s) of said medical target area, including at least one display for displaying the hottest temperature(s) of said medical target area and including means for indicating to a user that the hottest temperature being displayed is an estimated value.

34. A temperature measuring apparatus for interrogating a medical target area, said apparatus comprising:

a plurality of infrared sensors disposed in a sensor array, each of said sensors being capable of providing an output signal indicative of temperature of a portion of said medical target area such that said sensor array cumulatively provides a temperature profile of said medical target area;

processing means for processing output signals from the sensor array, said processing means including means for determining temperature based on the output signals therefrom, at least one lens for focusing a thermal image of said medical target area onto said sensor array including means for thermally isolating the sensor array from input other than that of the medical target area, wherein said thermal isolation means includes an aperture stop disposed in relation to said at least one lens and said sensor array to allow only energy from said medical target area and said aperture stop to impinge on said sensor array including a substrate supporting said sensor array, said aperture stop being thermally connected to said substrate such that said aperture stop and said substrate have substantially equivalent temperatures.

35. A temperature measuring apparatus for interrogating a medical target area, said apparatus comprising:

a plurality of infrared sensors disposed in a sensor array, each of said sensors being capable of providing an output signal indicative of temperature of a portion of said medical target area such that said sensor array cumulatively provides a temperature profile of said medical target area;

processing means for processing output signals from the sensor array, said processing means including means for determining temperature based on the output signals therefrom, at least one lens for focusing a thermal image of said medical target area onto said sensor array including means for thermally isolating the sensor array from input other than that of the medical target area, wherein said thermal isolation means includes an aperture stop disposed in relation to said at least one lens and said sensor array to allow only energy from said medical target area and said aperture stop to impinge on said sensor array, including means for measuring the temperature of said aperture stop.

36. An apparatus as recited in claim 35, wherein the sensor array can be compensated for using the measured temperature of said aperture stop.

37. An apparatus as recited in claim 35, wherein said aperture stop temperature measuring means includes at least one infrared sensor of said sensor array.

38. A temperature measuring apparatus for interrogating a medical target area, said apparatus comprising:

a plurality of infrared sensors disposed in a sensor array, each of said sensors being capable of providing an output signal indicative of temperature of a portion of said medical target area such that said sensor array cumulatively provides a temperature profile of said medical target area;

processing means for processing output signals from the sensor array, said processing means including means for determining temperature based on the output signals therefrom, and an instrument housing retaining said plurality of sensors, said housing including an insertion portion including a locator which enables said insertion portion to be positioned a predetermined distance in relation to said target area.

39. An apparatus as recited in claim 38, including an objective lens disposed in a distal end of said insertion portion in the optical path to said sensor array.

40. An apparatus as recited in claim 39, wherein said plurality of infrared sensors are disposed in said instrument housing, said apparatus further including at least one relay lens disposed in the optical path to said sensor array for focusing an image from the distal objective lens onto said sensor array.

41. A temperature measuring apparatus for interrogating a medical target area, said apparatus comprising:
   a plurality of infrared sensors disposed in a sensor array, each of said sensors being capable of providing an output signal indicative of temperature of a portion of said medical target area such that said sensor array cumulatively provides a temperature profile of said medical target area;
   processing means for processing output signals from the sensor array, said processing means including means for determining temperature based on the output signals therefrom, at least one lens for focusing a thermal image of said medical target area onto said sensor array including means for thermally isolating the sensor array from input other than that of the medical target area, wherein said thermal isolation means includes an aperture stop disposed in relation to said at least one lens and said sensor array to allow only energy from said medical target area and said aperture stop to impinge on said sensor array, including an instrument housing retaining said plurality of sensors, said housing including an insertion portion including a locator which enables said insertion portion to be positioned a predetermined distance in relation to said target area.

42. An apparatus as recited in claim 41, including an objective lens disposed in a distal end of said insertion portion in the optical path to said sensor array.

43. An apparatus as recited in claim 42, wherein said plurality of infrared sensors are disposed in said instrument housing, said apparatus further including at least one relay lens disposed in the optical path to said sensor array for focusing an image from the distal objective lens onto said sensor array.

44. An apparatus as recited in claim 43, wherein said aperture stop is disposed in relation to said at least one relay lens and said objective lens to substantially allow only energy from said medical area and said aperture stop to impinge on said sensor array.

45. An ear thermometer comprising:
   a plurality of infrared sensors disposed in a sensor array, each of said infrared sensors being capable of providing an output signal indicative of temperature of at least a section of a target area such that said array cumulatively provides a temperature profile of portions of the outer ear; and
   processing means for processing output signals from the sensor array, and
   means for displaying the output signals of said sensor array wherein said displaying means includes means for displaying all of the output signals of said sensor array.

46. An ear thermometer as recited in claim 45, wherein said displaying means includes at least one LCD capable of displaying at least one output signal from said sensor array.

47. An ear thermometer as recited in claim 45, wherein said displaying means includes a video monitor capable of displaying at least one output signal from said sensor array.

48. An ear thermometer as recited in claim 45, wherein said displaying means includes means for displaying the hottest temperature(s) of the medical target area interrogated by said sensor array.

49. An ear thermometer as recited in claim 45, including at least one lens for focusing a thermal image of said target area onto said sensor array.

50. An ear thermometer as recited in claim 49, including means for thermally isolating the sensor array.

51. An ear thermometer as recited in claim 50, wherein said thermal isolation means includes an aperture stop disposed in relation to said at least one lens and said sensor array to substantially allow only energy from said target area and said aperture stop to impinge on said sensor array.

52. An ear thermometer as recited in claim 51, including an instrument housing retaining said plurality of sensors, said housing including an insertion portion including a locator which enables said insertion portion to be positioned a predetermined distance in relation to said target area.

53. An ear thermometer as recited in claim 52, including an objective lens disposed in a distal end of said insertion portion in the optical path to said sensor array.

54. An ear thermometer as recited in claim 53, wherein said plurality of infrared sensors are disposed in said instrument housing, said apparatus further including at least one relay lens disposed in the optical path to said sensor array for focusing an infrared image from the distal objective lens onto said sensor array.

55. An ear thermometer as recited in claim 54, wherein said aperture stop is disposed in relation to said at least one relay lens and said objective lens to focus substantially only energy from said target and said aperture stop on said sensor array.

56. An ear thermometer as recited in claim 45, including at least one lens disposed in relation to said sensor array along an optical axis, said at least one of said at least one lens and said sensor array being movable for variably focusing the thermal area being imaged onto said sensor array.

57. An ear thermometer as recited in claim 45, wherein said sensor array is disposed on a substrate, said processing means including at least one of a thermocouple and a thermistor disposed on said substrate and a measuring circuit for determining the temperature of said substrate in order to compensate said sensor array.

58. An ear thermometer as recited in claim 45, wherein said sensor array is a linear one dimensional array.

59. An ear thermometer as recited in claim 45, wherein said sensor array is a two-dimensional sensor array.

60. An ear thermometer as recited in claim 45, including an instrument housing retaining said plurality of sensors, said housing including an insertion portion including a locator which enables said insertion portion to be positioned a predetermined distance in relation to said target area.

61. An ear thermometer as recited in claim 60, including an objective lens disposed in a distal end of said insertion portion in the optical path to said sensor array.

62. An ear thermometer comprising:
   a plurality of infrared sensors disposed in a sensor array, each of said infrared sensors being capable of providing an output signal indicative of temperature of at least a section of a target area such that said array cumulatively provides a temperature profile of portions of the outer ear;

processing means for processing output signals from the sensor array, and means for displaying the output signals of said sensor array wherein said displaying means produces a thermal image of at least a portion of the tympanic membrane.

63. An ear thermometer as recited in claim 62, wherein said processing means includes means for determining body core temperature from said temperature profile.

64. An ear thermometer as recited in claim 63, wherein said core body temperature determining means includes means for measuring each output signal of said sensor array and determining the output signals indicative of the hottest temperature in the outer ear.

65. An ear thermometer as recited in claim 63, wherein said processing means includes estimating means for estimating the hottest temperature(s) in the outer ear.

66. An ear thermometer as recited in claim 65, wherein said estimating means predicts the hottest output signals of at least one estimated temperature from a profile of output signals.

67. An ear thermometer as recited in claim 66, wherein said estimating means includes for extrapolating the core body temperature from a series of output signals if portions of the outer ear are obstructed from the sensor array.

68. An ear thermometer as recited in claim 63, including means for indicating to a user that the output signal corresponding to the hottest temperature measured by the sensor array is not the core body temperature.

69. An ear thermometer as recited in claim 68, wherein said indicating means includes at least one of the group consisting of audio, tactile, and light feedback.

70. An ear thermometer as recited in claim 62, including means for calibrating at least one infrared sensor of said sensor array.

71. An ear thermometer as recited in claim 70, wherein said calibration means includes a small target having a known temperature and emissivity disposed in the optical path of said sensor array.

72. An ear thermometer as recited in claim 71, including means for moving said target into and out of the optical path of said sensor array.

73. An ear thermometer as recited in claim 71, including at least one optical element aligned with said target of known temperature, said at least one of said at least one optical element and said sensor array being movable relative to the other of said at least one optical element and said sensor array.

74. An ear thermometer as recited in claim 70, including a temperature measuring element disposed in a least one of said sensor array and a substrate supporting said sensor array, said temperature measuring element being capable of measuring a reference temperature.

75. An ear thermometer comprising:

a plurality of infrared sensors disposed in a sensor array, each of said infrared sensors being capable of providing an output signal indicative of temperature of at least a section of a target area such that said array cumulatively provides a temperature profile of portions of the outer ear;

processing means for processing output signals from the sensor array, and means for displaying the output signals of said sensor array, wherein said displaying means displays a thermal image of at least a portion of the ear canal.

76. An ear thermometer comprising:

a plurality of infrared sensors disposed in a sensor array, each of said infrared sensors being capable of providing an output signal indicative of temperature of at least a section of a target area such that said array cumulatively provides a temperature profile of portions of the outer ear; and processing means for processing output signals from the sensor array, and means for displaying the output signals of said sensor array wherein said displaying means is capable of displaying a thermal image of at least a portion of an obstruction in the outer ear.

77. An ear thermometer comprising:

a plurality of infrared sensors disposed in a sensor array, each of said infrared sensors being capable of providing an output signal indicative of temperature of at least a section of a target area such that said array cumulatively provides a temperature profile of portions of the outer ear; and processing means for processing output signals from the sensor array, and means for displaying the output signals of said sensor array wherein said displaying means is capable of displaying a thermal image of at least a portion of an abscess in the outer ear.

78. An ear thermometer comprising:

a plurality of infrared sensors disposed in a sensor array, each of said infrared sensors being capable of providing an output signal indicative of temperature of at least a section of a target area such that said array cumulatively provides a temperature profile of portions of the outer ear; and processing means for processing output signals from the sensor array, and means for displaying the output signals of said sensor array, wherein said displaying means includes means for displaying specified ranges of temperatures of said thermal image in an predetermined format.

79. An ear thermometer as recited in claim 78, wherein said range displaying means includes means for displaying ranges of temperatures of said temperature profile in false colors.

80. An ear thermometer comprising:

a plurality of infrared sensors disposed in a sensor array, each of said infrared sensors being capable of providing an output signal indicative of temperature of at least a section of a target area such that said array cumulatively provides a temperature profile of portions of the outer ear; and processing means for processing output signals from the sensor array, wherein said processing means includes means for determining pulse based upon temporal variations in the output signals of certain portions of said temperature profile.

81. An ear thermometer comprising:

a plurality of infrared sensors disposed in a sensor array, each of said infrared sensors being capable of providing an output signal indicative of temperature of at least a section of a target area such that said array cumulatively provides a temperature profile of portions of the outer ear; and processing means for processing output signals from the sensor array wherein said processing means includes means for determining body core temperature from said temperature profile, said processing means includes estimating means for estimating the hottest temperature(s) in the outer ear wherein said estimating means includes means for interpolating the hottest temperature from the output signals in said sensor array.

82. An ear thermometer comprising:
a plurality of infrared sensors disposed in a sensor array, each of said infrared sensors being capable of providing an output signal indicative of temperature of at least a section of a target area such that said array cumulatively provides a temperature profile of portions of the outer ear; and
processing means for processing output signals from the sensor array, wherein said processing means includes means for determining body core temperature from said temperature profile including means for indicating to a user that the output signal corresponding to the hottest temperature measured by of the sensor array is not the core body temperature, wherein said indicating means includes directional guiding means for guiding a user to that portion of the outer ear having the hottest temperature.

83. An ear thermometer as recited in claim 82, wherein said indicating means includes at least one of the group consisting of audio, tactile, and light feedback.

84. An ear thermometer comprising:
a plurality of infrared sensors disposed in a sensor array, each of said infrared sensors being capable of providing an output signal indicative of temperature of at least a section of a target area such that said array cumulatively provides a temperature profile of portions of the outer ear;
processing means for processing output signals from the sensor array, wherein said processing means includes means for determining body core temperature and
at least one display for displaying the core body temperature(s) and including means for indicating to a user that the core body temperature being displayed is an estimated value.

85. An ear thermometer comprising:
a plurality of infrared sensors disposed in a sensor array, each of said infrared sensors being capable of providing an output signal indicative of temperature of at least a section of a target area such that said array cumulatively provides a temperature profile of portions of the outer ear;
processing means for processing output signals from the sensor array, wherein said processing means includes means for determining body core temperature, at least one lens for focusing a thermal image of said target area onto said sensor array, means for thermally isolating the sensor array, means for thermally isolating the sensor array wherein said thermal isolation means includes an aperture stop disposed in relation to said at least one lens and said sensor array to allow only energy from said target area and said aperture stop to impinge on said sensor array and a substrate supporting said sensor array, said aperture stop being thermally connected to said substrate such that said aperture stop and said substrate have substantially equivalent temperatures.

86. An ear thermometer comprising:
a plurality of infrared sensors disposed in a sensor array, each of said infrared sensors being capable of providing an output signal indicative of temperature of at least a section of a target area such that said array cumulatively provides a temperature profile of portions of the outer ear;
processing means for processing output signals from the sensor array, wherein said processing means includes means for determining body core temperature, at least one lens for focusing a thermal image of said target area onto said sensor array, means for thermally isolating the sensor array, means for thermally isolating the sensor array wherein said thermal isolation means includes an aperture stop disposed in relation to said at least one lens and said sensor array to allow only energy from said target area and said aperture stop to impinge on said sensor array, including means for measuring the temperature of said baffle.

87. An ear thermometer as recited in claim 86, wherein said sensor array can be compensated for using the measured temperature of said aperture stop.

88. An ear thermometer as recited in claim 86, wherein said aperture stop temperature measuring means includes at least one infrared sensor of said sensor array.

89. An ear thermometer comprising:
a plurality of infrared sensors disposed in a sensor array, each of said infrared sensors being capable of providing an output signal indicative of temperature of at least a section of a target area such that said array cumulatively provides a temperature profile of portions of the outer ear;
processing means for processing output signals from the sensor array, wherein said processing means includes means for determining body core temperature, an instrument housing retaining said plurality of sensors, said housing including an insertion portion including a locator which enables said insertion portion to be positioned a predetermined distance in relation to said target area including an objective lens disposed in a distal end of said insertion portion in the optical path to said sensor array, wherein said plurality of infrared sensors are disposed in said instrument housing said apparatus further including at least one relay lens disposed in the optical path to said sensor array for focusing an image from the distal objective lens onto said sensor array.

90. A method for accurately determining the temperature of a medical target comprising the steps of:
aiming a sensor array at a medical target, said sensor array comprising a plurality of infrared sensing elements each being capable of providing an output signal indicative of temperature of a portion of said medical target;
determining the temperature of at least a portion of said medical target; and
outputting the signal representative of temperature of at least a portion of said medical target, said outputting step including the step of displaying the value of at least one output signal including the step of displaying ranges of a temperature profile of said medical target in a predetermined format,
wherein the step of displaying ranges of the temperature profile includes the step of determining the core body temperature of a patient.

91. A method as recited in claim 90, further including the steps of measuring each output signal of said sensor array and determining the output signals of the hottest temperature(s) of said medical target.

92. A method as recited in claim 90, further including the step of estimating the hottest temperature of portions if the medical target are one of obstructed and not detected by the sensor array.

93. A method as recited in claim 92, wherein said estimating step includes the step of predicting the hottest output signals for at least one estimated temperature from a profile of output signals.

94. A method as recited in claim 93, wherein said estimating means includes the step of extrapolating the hottest temperature from a series of output signals if portions of the medical target are obstructed from the sensor array.

95. A method as recited in claim 90, further including the step of indicating to a user that the output signal corresponding to the hottest temperature of said sensor array does not indicate the hottest temperature of the medical target.

96. A method as recited in claim 95, wherein said indicating step includes the step of providing at least one of audio, tactile, and light feedback to the user.

97. A method as recited in claim 90, wherein said sensor array is disposed on a substrate, said method including the further steps of measuring the temperature of the substrate and compensating the sensor array to account for the measured temperature of the substrate.

98. A method for accurately determining a method for accurately determining the temperature of a medical target comprising the steps of:
aiming a sensor array at a medical target, said sensor array comprising a plurality of infrared sensing elements each being capable of providing an output signal indicative of temperature of a portion of said medical target; and
determining the temperature of at least a portion of said medical target, including the step of determining pulse based on temporal variations in predetermined output signals of said sensor array.

99. A method as recited in claim 98, including the step of outputting the signal representative of temperature of said portion of the medical target.

100. A method as recited in claim 98, including the step of outputting the signal representative of temperature of said portion of the medical target wherein the outputting step includes the step of displaying the value of at least one output signal.

101. A method as recited in claim 98, including the step of outputting the signal representative of temperature of said portion of the medical target wherein the outputting step includes the step of displaying a thermal image of said medical target.

102. A method as recited in claim 101, including the step of superimposing the thermal image of said target with an optical image of said target.

103. A method as recited in claim 102, wherein said thermal sensor array is disposed in an instrument housing, said housing including an insertion portion having a locator to enable said insertion portion to be positioned a predetermined distance in relation to said sensor array and with optical imaging means of an optical imaging instrument for providing said optical image.

104. A method as recited in claim 100, wherein said displaying step includes the step of displaying at least one output signal of said sensor array using a video monitor.

105. A method as recited in claim 100, wherein said displaying step includes the step of displaying the hottest temperature(s) of the medical target interrogated by said sensor array.

106. A method as recited in claim 100, wherein said displaying step includes the step of displaying all of the output signals of said sensor array.

107. A method as recited in claim 100, wherein said displaying step includes the step of displaying ranges of a temperature profile of said medical target in a predetermined format.

108. A method as recited in claim 98, wherein said determining step includes the step of determining the core body temperature of a patient.

109. A method as recited in claim 98, including the step of calibrating at least one infrared sensor of said sensor array.

110. A method as recited in claim 109, wherein said calibrating step includes the step of positioning a target having a known temperature and emissivity in the optical path to the sensor array.

111. A method as recited in claim 110, including the step of selectively moving said target into and out of the optical path to said sensor array.

112. A method as recited in claim 110, including the step of selectively moving at least one of said known target and an optical element aligned with said target in order to move the target into and out of the optical path to the sensor array.

113. A method as recited in claim 109, wherein said calibration step includes the step of measuring a reference temperature from a temperature measuring element disposed in at least one of said sensor array and a substrate supporting said sensor array.

114. A method as recited in claim 98, including the step of focusing a thermal image of said medical target onto said sensor array.

115. A method as recited in claim 114, including the step of thermally isolating the sensor array from input other than that of the medical target prior to said aiming step.

116. A method as recited in claim 115, wherein the thermal isolating step includes the step of placing an aperture stop in relation to a focusing lens and said sensor array in order to allow substantially only energy from said medical target and said aperture stop to impinge on said sensor array.

117. A method as recited in claim 116, wherein said sensor array is disposed in an instrument housing, said housing including an insertion portion having a locator to enable said insertion portion to be positioned a predetermined distance in relation to said sensor array.

118. A method as recited in claim 117, including the step of providing an objective lens in a distal end of said insertion portion of the optical path to said sensor array.

119. A method as recited in claim 118, further including the step of providing at least one relay lens in the optical path of said sensor array for focusing a thermal image from the distal objective lens onto said sensor array.

120. A method as recited in claim 98, including the step of moving at least one of at least one lens disposed in the optical path to said sensor array and said sensor array for variably focusing an image of said medical target onto said sensor array.

121. A method as recited in claim 98, wherein said medical target is the tympanic membrane.

122. A method as recited in claim 98, wherein said medical target is the armpit.

123. A method as recited in claim 98, wherein said medical target is under the tongue.

124. A method as recited in claim 98, wherein said medical target is the colon.

125. A method as recited in claim 98, wherein said medical target is the rectum.

126. A method as recited in claim 98, wherein said medical target is the temple area of a patient.

127. A method as recited in claim 98, wherein said medical target is an in vivo portion of the skin.

128. A method as recited in claim 98, wherein said medical target is the tympanic membrane.

129. A method for accurately determining the temperature of a medical target comprising the steps of:
aiming a sensor array at a medical target, said sensor array comprising a plurality of infrared sensing elements each being capable of providing an output signal indicative of temperature of a portion of said medical target;
determining the temperature of at least a portion of said medical target, and estimating the hottest temperature of portions if the medical target are one of obstructed and not detected by the sensor array and interpolating the hottest temperature from the output signals in said sensor array.

130. A method for accurately determining the temperature of a medical target comprising the steps of:
aiming a sensor array at a medical target, said sensor array comprising a plurality of infrared sensing elements each being capable of providing an output signal indicative of temperature of a portion of said medical target;
determining the temperature of at least a portion of said medical target, outputting the signal representative of temperature of said portion of the medical target, indicating to a user that the output signal corresponding to the hottest temperature of said sensor array does not indicate the hottest temperature of the medical target and directionally guiding a user to the portion of the medical target having the hottest temperature.

131. A method as recited in claim 130, wherein said indicating step includes the step of providing at least one of audio, tactile and light feedback to the user.

132. A method for accurately determining the temperature of a medical target comprising the steps of:
aiming a sensor array at a medical target, said sensor array comprising a plurality of infrared sensing elements each being capable of providing an output signal indicative of temperature of a portion of said medical target;
determining the temperature of at least a portion of said medical target, estimating the hottest temperature of portions if the medical target are one of obstructed and not detected by the sensor array, displaying the hottest temperature of the medical target and indicating to a user that the displayed temperature is an estimated value if portions of the medical target are obstructed.

133. A method for accurately determining the temperature of a medical target comprising the steps of:
aiming a sensor array at a medical target, said sensor array comprising a plurality of infrared sensing elements each being capable of providing an output signal indicative of temperature of a portion of said medical target; and
determining the temperature of at least a portion of said medical target, outputting the signal representative of temperature of said portion of the medical target, focusing a thermal image of said medical target onto said sensor array, thermally isolating the sensor array from input other than that of the medical target prior to said aiming step, wherein the thermal isolating step includes the step of placing an aperture stop in relation to a focusing lens and said sensor array in order to allow substantially only energy from said medical target and said aperture stop to impinge on said sensor array and measuring the temperature of the aperture stop and compensating the sensor array using the measured temperature of said aperture stop.

134. A method for accurately determining the temperature of a medical target comprising the steps of:
aiming a sensor array at a medical target, said sensor array comprising a plurality of infrared sensing elements each being capable of providing an output signal indicative of temperature of a portion of said medical target; and
determining the temperature of at least a portion of said medical target, outputting the signal representative of temperature of said portion of the medical target, focusing a thermal image of said medical target onto said sensor array, thermally isolating the sensor array from input other than that of the medical target prior to said aiming step, wherein the thermal isolating step includes the step of placing an aperture stop in relation to a focusing lens and said sensor array in order to allow substantially only energy from said medical target and said aperture stop to impinge on said sensor array and thermally connecting the baffle to a substrate supporting said sensor array, such that the baffle and substrate have substantially equivalent temperatures.

135. A method for accurately determining the temperature of a medical target comprising the steps of:
aiming a sensor array at a medical target, said sensor array comprising a plurality of infrared sensing elements each being capable of providing an output signal indicative of temperature of a portion of said medical target; and
determining the temperature of at least a portion of said medical target, wherein said sensor array is disposed in an instrument housing, said housing including an insertion portion having a locator to enable said insertion portion to be positioned a predetermined distance in relation to said sensor array.

136. A method as recited in claim 135, including the step of providing an objective lens in a distal end of said insertion portion of the optical path to said sensor array.

137. A method as recited in claim 136, further including the step of providing at least one relay lens in the optical path of said sensor array for focusing a thermal image from the distal objective lens onto said sensor array.

* * * * *